United States Patent
Suzuki et al.

[11] Patent Number: 5,962,947
[45] Date of Patent: *Oct. 5, 1999

[54] MOTOR STRUCTURE

[75] Inventors: Yuzuru Suzuki; Haruyoshi Hino; Sakae Fujitani; Naomi Inoue; Hideki Sakiyama, all of Shizuoka-ken, Japan

[73] Assignee: Minebea Co., Ltd., Kitasaku, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,253

[22] Filed: Aug. 13, 1997

[30] Foreign Application Priority Data

Oct. 18, 1996 [JP] Japan ................................. 8-276487

[51] Int. Cl.⁶ ........................... H02K 1/12; H02K 19/04
[52] U.S. Cl. ........................... 310/257; 310/162; 310/164
[58] Field of Search ........................... 310/49 A, 49 R, 310/162, 164, 254, 257

[56] References Cited

U.S. PATENT DOCUMENTS

| | | | |
|---|---|---|---|
| 3,119,941 | 1/1964 | Guiot | 310/49 A |
| 4,052,630 | 10/1977 | Inariba | 310/162 |
| 4,059,780 | 11/1977 | Mazuir | 310/164 |
| 4,634,907 | 1/1987 | Lechner | 310/49 R |
| 4,656,381 | 4/1987 | Komatsu | 310/257 |
| 4,739,201 | 4/1988 | Brigham et al. | 310/49 R |
| 4,972,109 | 11/1990 | Kakizaki et al. | 310/49 A |
| 5,291,084 | 3/1994 | Shiotsuki et al. | 310/49 R |
| 5,679,997 | 10/1997 | Matsuzawa et al. | 310/254 |

FOREIGN PATENT DOCUMENTS

| | | | |
|---|---|---|---|
| 1 197 112 | 11/1959 | France . | |
| 45182 | 1/1966 | Germany | 310/257 |
| 521 043 | 5/1972 | Switzerland . | |

OTHER PUBLICATIONS

Patent Abstracts of Japan, No. 61167366, (Jul. 29, 1986).

*Primary Examiner*—Clayton LaBalle
*Attorney, Agent, or Firm*—Staas & Halsey

[57] ABSTRACT

To reduce as much as possible the motor vibration due to the effect of harmonic components contained in the induced electromotive force waveform induced in the armature coil. In a motor structure, the pole tooth shapes of one pole tooth and the corresponding pole tooth thereto constituting one phase are made different from each other by changing their areas or amounts of skew, whereby the third harmonics caused by variations in the magnetic fluxes interlinking with these pole teeth are caused to cancel each other. Thus, the rotational vibration which has hitherto been a problem can be reduced and, further, the accuracy of the rotor movement can be improved without lowering the dynamic torque characteristic of the motor.

7 Claims, 8 Drawing Sheets

RELATIONSHIP BETWEEN AMOUNT OF SKEW AND A PHASE OF THIRD HARMONICS $y = 2172.8x^2 - 1634.1x + 483.29$

MOTOR STRUCTURE

BACKGROUND OF THE INVENTION

1. Field of the Invention

The present invention relates to a structure of a motor and more particularly to a structure of a motor whose performance is bettered by improving its magnetic circuit.

2. Description of the Prior Art

Stepping motors are widely used in office automation equipment, computer peripheral equipment, industrial equipment, and the like. The stepping motor is an electric motor rotatably driven by an input pulsating alternating current. The angle of rotation is proportional to the number of pulses of the input alternating current and the rotational speed is proportional to the frequency of the same. Accordingly, there is no need for detecting the rotor position of the stepping motor. Namely, since the stepping motor is driven in an open loop system, the rotor rotates such that the magnetic reluctance is minimized. Hence, the rotating condition of the rotor depends on both the magnetic flux generated from the rotor (magnetic flux distribution of the magnet) and the magnetic flux generated from the stator (magnetic flux distribution of the armature).

The shape of the stator pole tooth as the interface between the rotor and the stator, especially the shape of the stator pole tooth of a claw pole type, cannot be formed to be considerably long on account of technical difficulty in manufacturing. When it is formed to be long, the pole tooth is formed in the shape of a trapezoid having a wider base to prevent magnetic saturation from occurring in the pole tooth. Further, the stator pole teeth forming one phase are made in the same shape. Hence, the stepping motor has a defect that, when it is driven, its rotational fluctuation becomes so great as to produce vibration.

In modern high performance equipment, there are increasing possibilities that the vibration occurring in the stepping motor adversely affects other component parts and causes malfunctions in the equipment. Therefore, as methods for suppressing the motor vibration, there are used a method for keeping the stepping motor in a floating condition by using vibration-proofing rubber as disclosed in the gazette of Japanese Patent Laid-open No. Hei 4-26355 and a method to decrease vibration by modifying the drive circuit as disclosed in the gazette of Japanese Utility Model Laid-open No. Sho 59-111500. These methods were unavoidably accompanied by increase in the number of component parts and complexity of circuits and, hence, invited increases in cost. Further, these methods were countermeasures taken from outside the stepping motor leaving the source of the vibration still existing in the body of the stepping motor and, therefore, they were not essential solutions of the problem. Other motors than stepping motors having magnetic poles, such as DC servomotors and brushless motors, also have similar problem.

In order to obtain a low-vibration motor by cutting off the source of the vibration for suppressing the vibration of the motor itself, it is an effective way to lower the detent torque. Although the detent torque can be lowered by increasing the gap between the rotor and the pole tooth, as a general practice for lowering the detent torque, it unavoidably follows lowering of the dynamic torque and, thereby, the performance of the stepping motor is deteriorated. Therefore, it becomes necessary to advance analysis of the detent torque as the essential vibration source and to achieve low vibration of the motor without deteriorating its performance by making changes in the structure of the motor.

SUMMARY OF THE INVENTION

The present invention was made to meet the above described technical requirements and it is an object of the invention to reduce as much as possible the motor vibration due to higher harmonic components contained in the waveform of the induced electromotive force induced in the armature coil. Through the analysis of the detent torque, it was found that the magnitude of the vibration is governed by the quantity of the higher harmonics, especially of the third harmonics, contained in the induced electromotive force waveform and, further, as the factor affecting the quantity of the third harmonics, it was found that the slant of the lateral side of the pole tooth constituting the magnetic pole of the stator yoke portion (hereinafter called the amount of skew) changes the phase of the higher harmonics, though it does not change the proportion of the harmonic component. From these facts, it was confirmed that there exists a certain relationship (quadratic functional relationship) between the phase of the third harmonics and the phase of the fundamental wave and that there is no correlation between the amount of skew (within the range in which the amount of skew is variable) and the amplitude of the harmonic component, but it depends on the gap between adjoining pole teeth.

Therefore, while the distance between the pole teeth of a pair of stator yoke portions constituting one phase is suitably set, the sizes (areas) of the pole teeth constituting one phase are made different from each other or the amounts of skew of the pole teeth are adjusted, so that a phase shift of an electric angle of 180° is set up between the third harmonics occurring in the pair of stator yoke portions, and, thereby, the third harmonics are caused to cancel each other and an induced electromotive force waveform containing virtually no harmonic components can be obtained. Thus, suppression of the motor vibration can be achieved. Further, by setting the distance between the pole teeth to a suitable value greater than the distance between the pole tooth and the other part in confronting relationship therewith (the rotor magnet in the case of a rotating electric machine), the vibration can be greatly reduced without lowering the dynamic torque.

DESCRIPTION OF THE PREFERRED EMBODIMENTS

Figure 1:
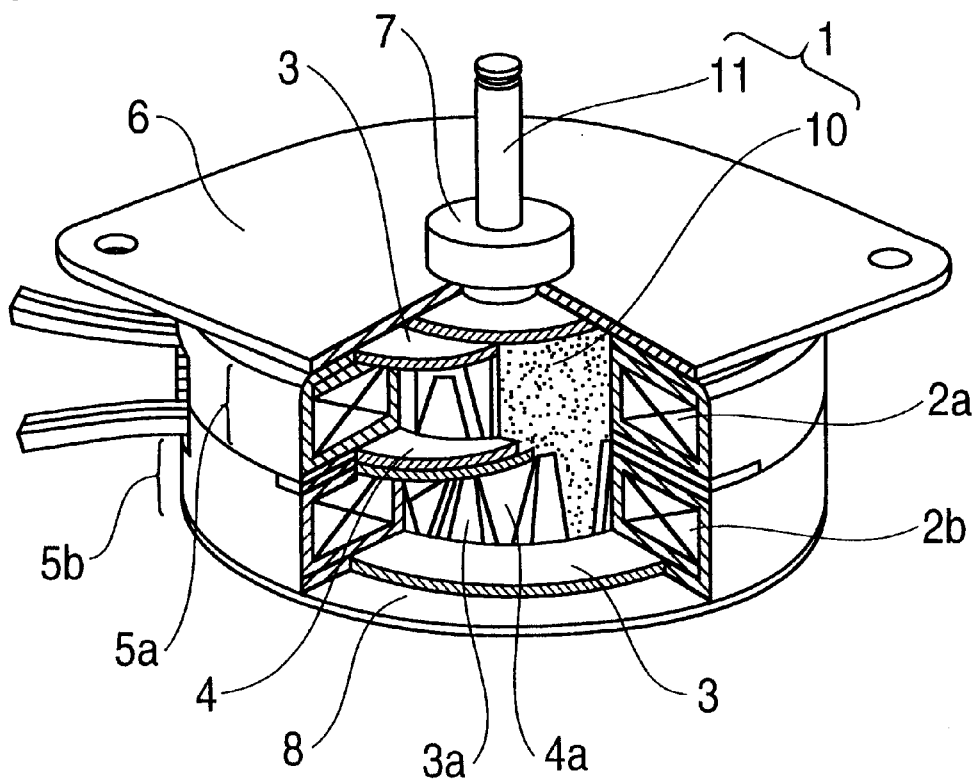
FIG. 1 is a perspective view with a portion broken away of the present invention applied to a claw pole type two-phase stepping motor.
Figure 2:
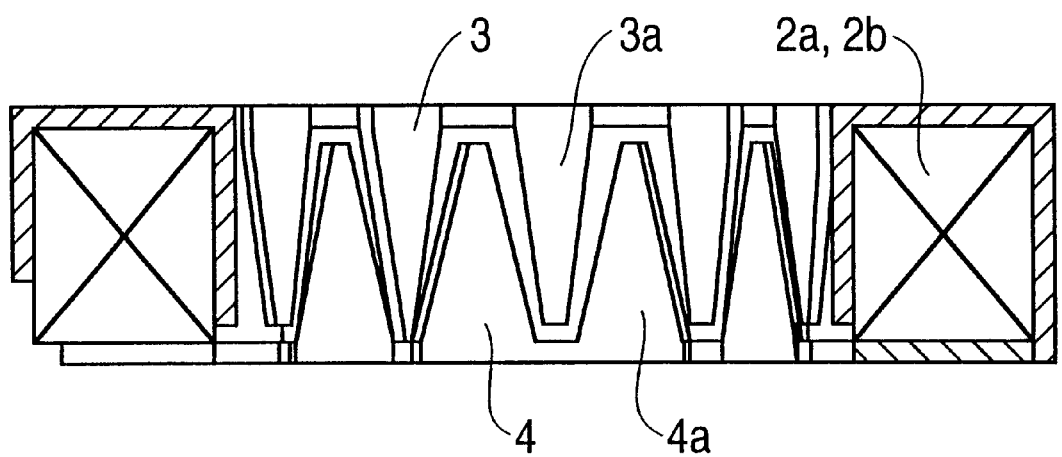
FIG. 2 is a development showing the stator pole tooth portion of the invention.
Figure 3:
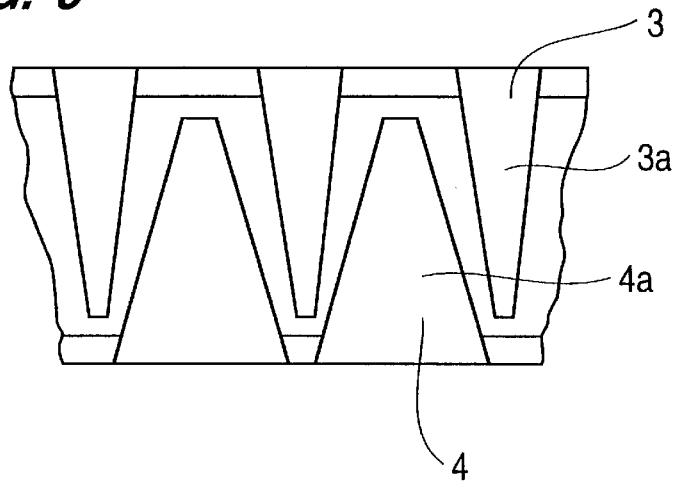
FIG. 3 is an enlarged partial view of the stator pole tooth portion shown in FIG. 2.
Figure 4:
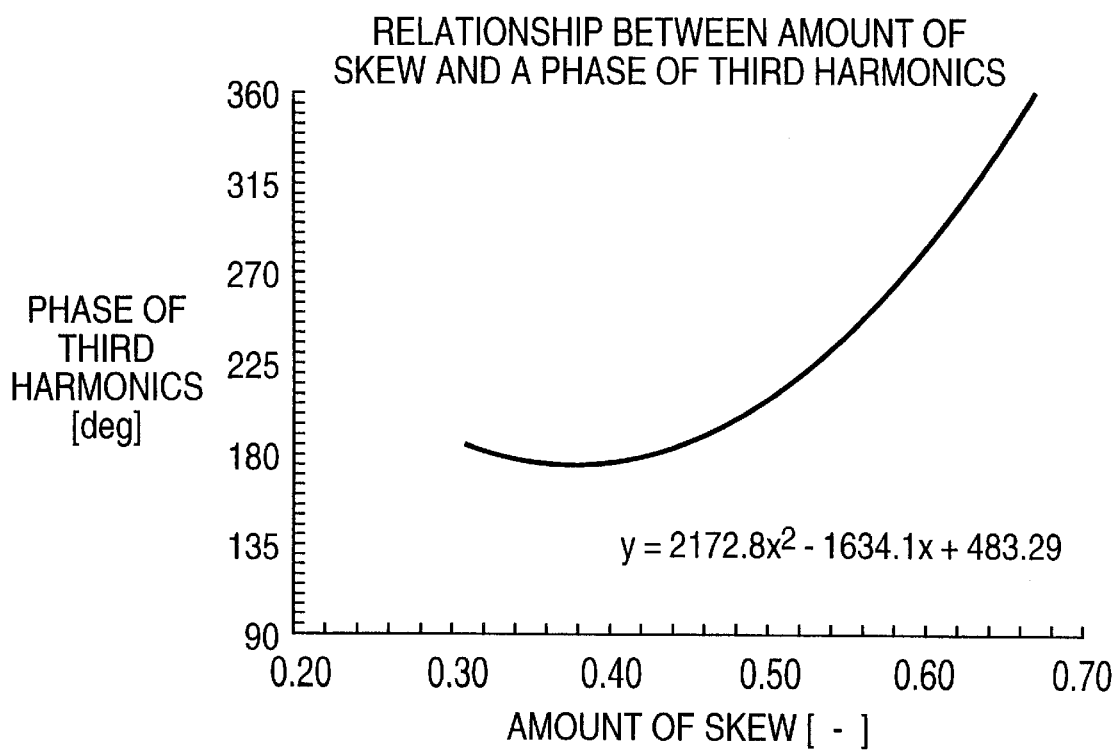
FIG. 4 is a characteristic diagram showing the relationship between the pole tooth skew amount of a claw pole type two-phase stepping motor and the phase of the third harmonics contained in the induced electromotive force waveform generated in the armature coil.
Figure 5:
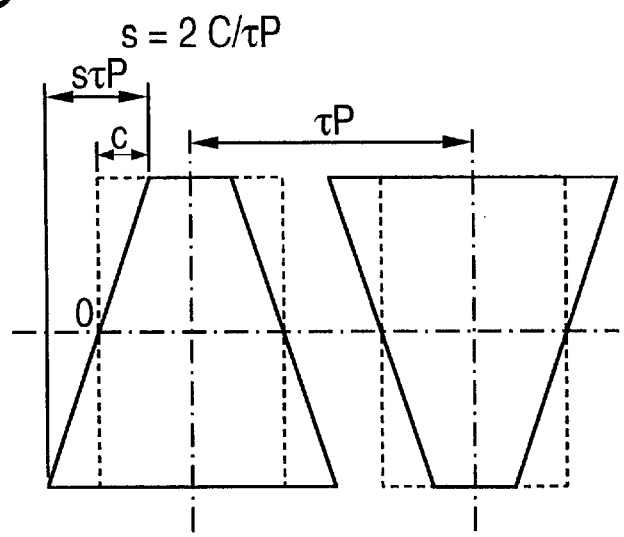
FIG. 5 is an explanatory drawing giving definition of the amount of skew of a pole tooth.

An embodiment of the invention will be described in detail with reference to the accompanying drawings. FIG. 1 is a perspective sectional view of a claw pole type two-phase stepping motor to which the present invention is applied, FIG. 2 is a development of the stator pole tooth portion shown in FIG. 1, and FIG. 3 is an enlarged development of the pole tooth portion shown therein. FIG. 4 is a diagram showing the relationship between the amount of skew of the pole tooth of a 48-step stepping motor and the phase of the third harmonics, contained in the induced electromotive force waveform induced in the armature coil by rotation of the rotor, with respect to the fundamental wave (obtained as the results of experiments) FIG. 5 is a diagram defining the amount of skew of the pole tooth. In FIG. 5, the amount of skew s is defined as $s=2C/\tau P$, where $C=\frac{1}{2}$ of the slant portion of the lateral side of the pole tooth and $\tau P$=pole pitch (the length of the electric angle $\pi$).

Referring to FIG. 1, reference numeral 1 denotes a rotor constituting a first part, which has a permanent magnet 10 with 24 poles of N poles and S poles alternately magnetized on its peripheral surface and a revolving shaft 11 fixed to its center by means of insert mold. Reference numeral 2a denotes an A-phase coil formed of a bobbin with polyurethane copper wire wound around the same. Reference numeral 2b denotes a B-phase coil which has the same structure as the A-phase coil 2a. Reference numeral 3 denotes an outer yoke, which has 12 pole teeth 3a in a comb teeth shape serving as magnetic poles arranged on its inner peripheral surface. Reference numeral 4 denotes an inner yoke, which, like the outer yoke 3, has 12 pole teeth 4a in the comb teeth shape serving as magnetic poles arranged on its inner peripheral surface. Each of them, as shown in FIG. 2, has such a configuration that the coil 2a or 2b is sandwiched between the outer yoke 3 and the inner yoke 4 and an A-phase stator 5a constituting the second part and a B-phase stator 5b similarly constituting the second part are each constructed of each of the coils. Further, both of the inner yokes are fixed together in a back-to-back manner such that the A-phase stator 5a and the B-phase stator 5b have a phase difference of an electric angle of 90° between them.

Further, the outer yoke 3, together with a flange 6, at the upper side and the outer yoke 3 at the lower side are each provided with a bearing 7 (the bearing at the lower side is not shown). The revolving shaft 11 supporting the rotor 1 is rotatably borne by the bearings. The magnetization on the permanent magnet 10 of the rotor 1 is provided such that the flux distribution takes on a sinusoidal waveform. Here, as to the amount of skew of the pole tooth 3a of the outer yokes 3 and the amount of skew of the pole tooth 4a of the inner yokes 4 constituting the A-phase stator 5a and the B-phase stator 5b, the amount of skew of the pole tooth 4a is set to be greater than the other as shown in FIG. 2 and FIG. 3, so that the magnetic fluxes interlinking with the A-phase coil 2a and the B-phase coil 2b in the magnetic circuits including the rotor 1, i.e., the phases of the third harmonics contained in the induced electromotive force waveform in each of A-phase and B-phase with respect to the fundamental wave may amount to an electric angle of 180°.

Although the amount of skew of the pole tooth 4a of the inner yoke 4, in the present embodiment, is set to be greater than that of the outer yoke 3, it is obvious that the same effect can be obtained even if the amount of skew of the pole tooth 3a of the outer yoke 3 is conversely made greater than that of the inner yoke 4. By the above described arrangement, when the rotor 1 is rotated (the motor is driven) by a power supply from the drive circuit to the A-phase coil 2a and the B-phase coil 2b of the motor, the phase of the generated third harmonics depending on the amount of skew of the pole tooth 3a of the outer yoke 3 and the phase of the generated third harmonics depending on the amount of skew of the pole tooth 4a of the inner yoke 4, in the induced electromotive force waveform induced on the A-phase coil 2a (or B-phase coil 2b) by one A-phase stator 5a (or B-phase stator 5b), become completely opposite, i.e., have a phase difference between them of an electric angle of approximately 180° and their amplitudes become equal. Therefore, they when synthesized cancel each other and the third harmonics component become virtually zero.

Figure 6:
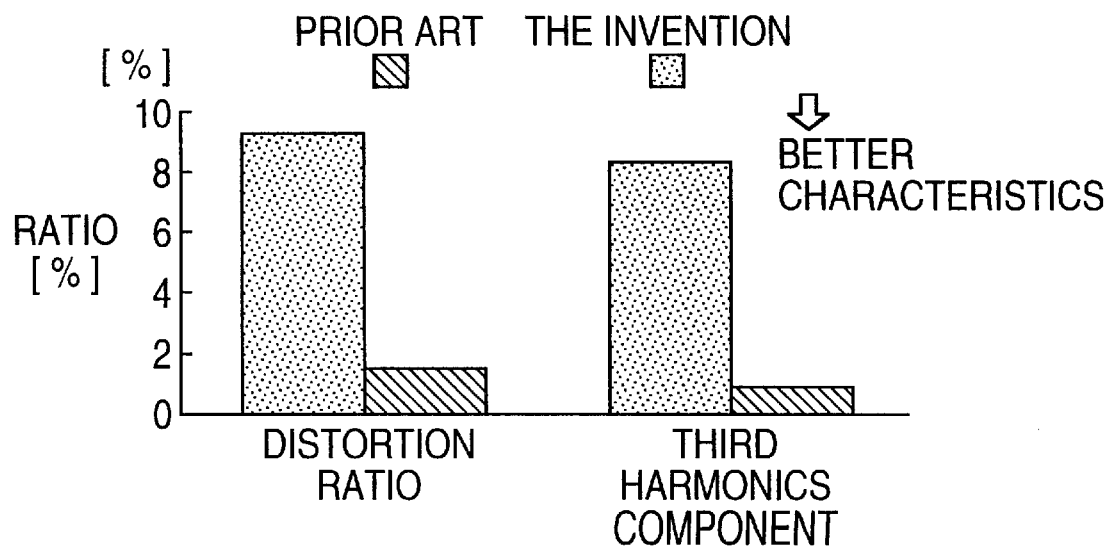
FIG. 6 is a characteristic diagram showing data in which the total harmonics distortion ratio of the stepping motor according to the invention and the third harmonics component of the same are suppressed.
Figure 7:
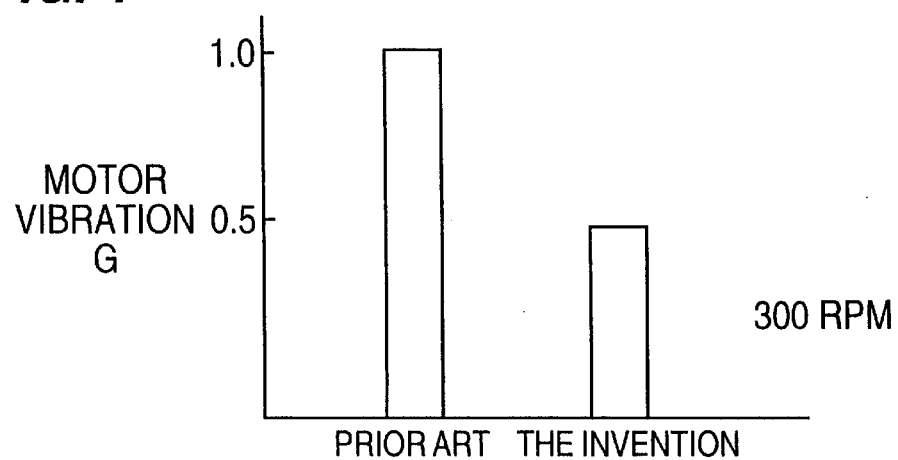
FIG. 7 is a characteristic diagram showing decrease in the rotational vibration of the motor according to the invention.
Figure 8:
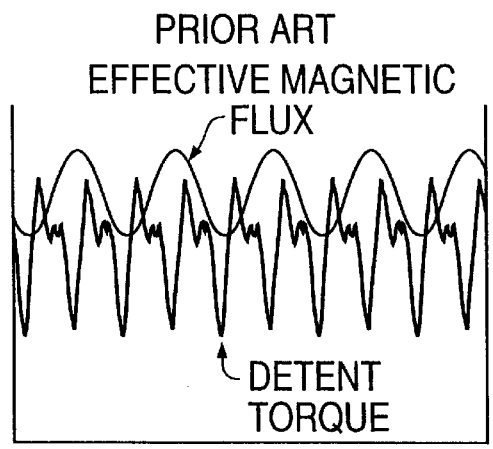
FIGS. 8 and 8A show diagrams explanatory of comparison between the detent torques of stepping motors of a conventional type and the present invention.
Figure 8A:
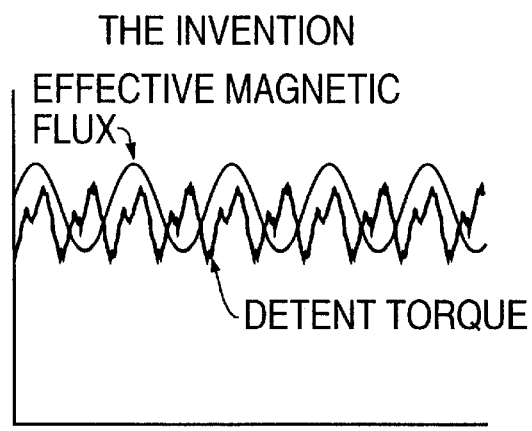
Figure 9:
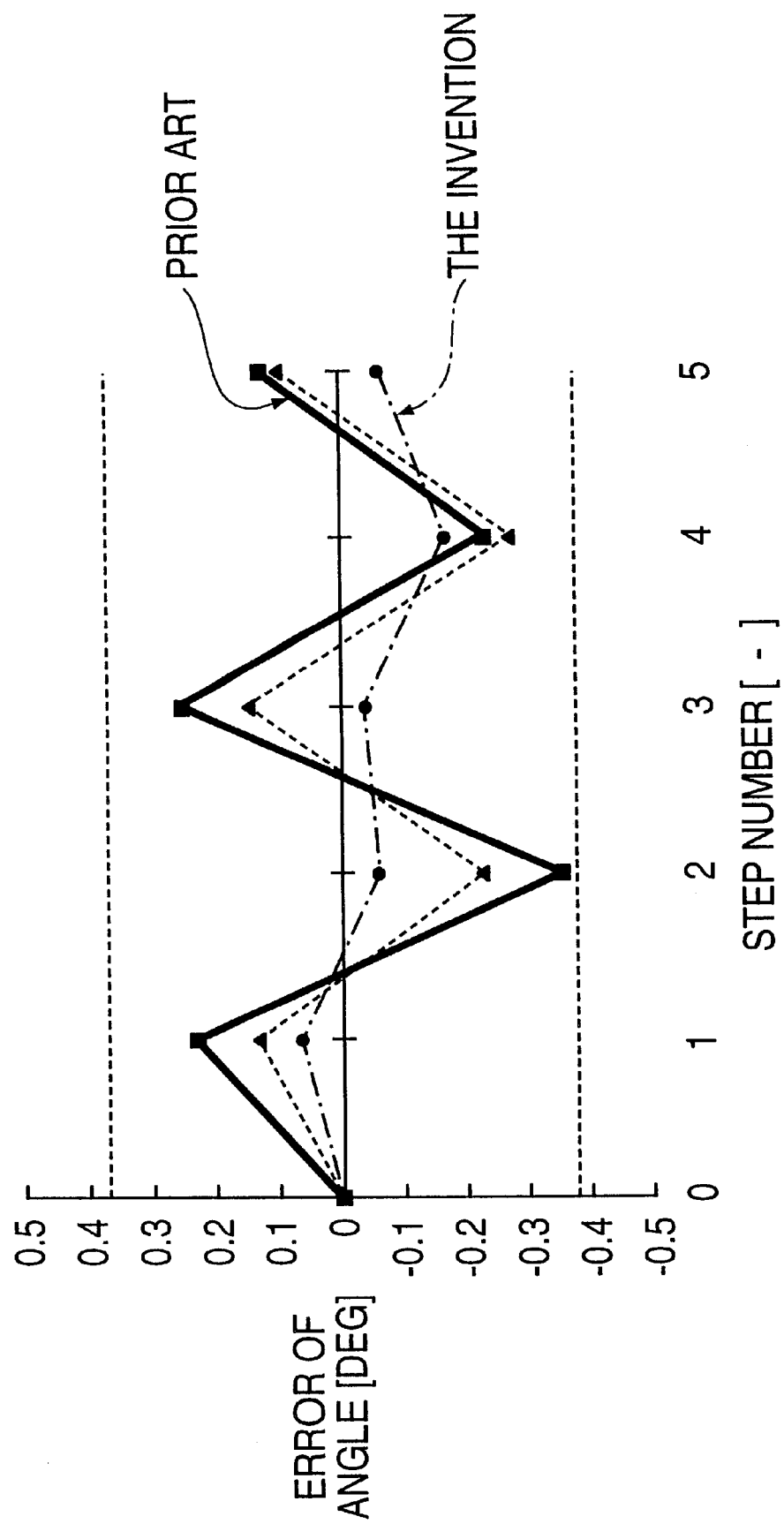
FIG. 9 is a comparison diagram comparing angular errors of stepping motors of a conventional type and the present invention.
Figure 10:
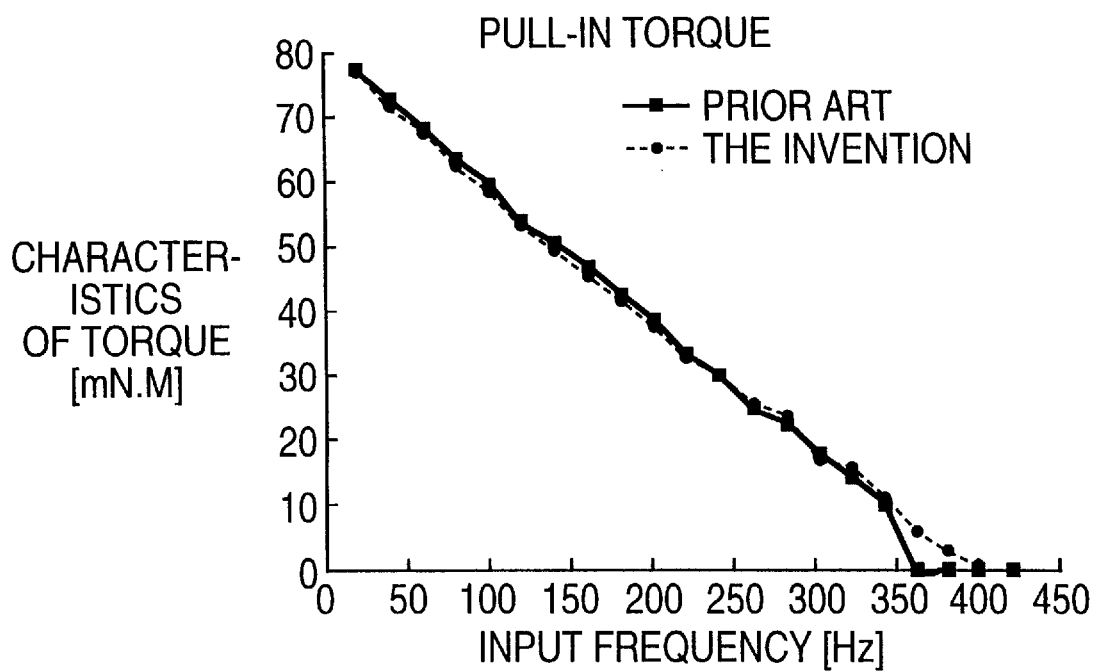
FIGS. 10 and 10A show comparison diagrams comparing pull-in and pull-out torques of stepping motors of a conventional type and the present invention.
Figure 10A:
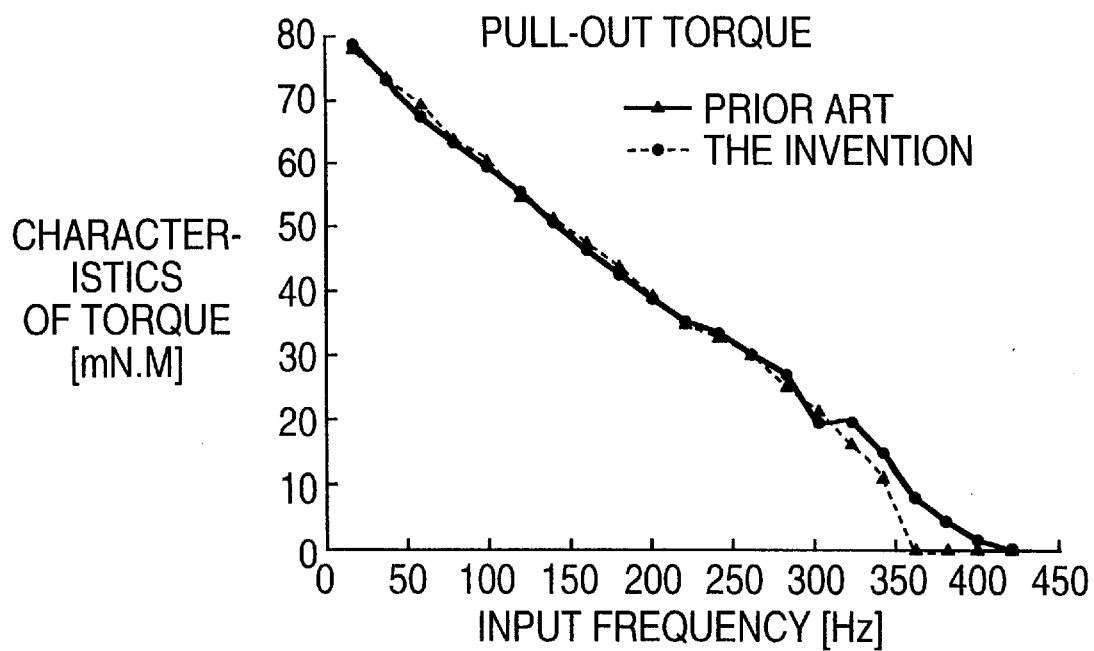

The results are shown in FIG. 6. As apparent from FIG. 6, when compared with conventional products, the distortion ratio of the total harmonics in the induced electromotive force waveform was reduced from 10% to 1.6% and the content of the third harmonics was reduced from 9% to 0.9%. As an effect obtained from the foregoing, the motor vibration was reduced to ½ of that in the conventional products as shown in FIG. 7. Further, by the increase of the amount of skew, the detent torque was reduced by approximately 60% as compared with the conventional products as shown in FIGS. 8 and 8A. Therefore, the effect of the detent torque became smaller and the error of angle was reduced from ±4% in the conventional products to less than ±2% as shown in FIG. 9, whereby an improvement in the accuracy of the angle was achieved. Further, since the proportion of the third harmonics (total harmonics) to the effective magnetic flux became extremely small, the torque acting as a brake on the dynamic torque generated by the fundamental wave becomes very small, and since the distance between adjacent pole teeth was maintained to be virtually the same as that in the conventional products, the leakage magnetic flux hardly varies, and, hence, the dynamic torque of the motor is kept at the same level as that of the conventional products or somewhat improved over that as shown in FIGS. 10 and 10A.

As the reason why the torque is increased to a certain degree, it can be mentioned that the detent torque has been made smaller and, hence, the braking torque has been made smaller, while the dynamic torque generating performance of the motor is kept on the same level as that of the conventional products. As the result, the dynamic torque grater than the conventional products can be obtained.

According to the present invention, as described above, non-uniformity in the rotation of the rotor 1 due to third harmonics as the main factor of the motor vibration can be eliminated, accuracy of the angle and the like can be improved, and the motor vibration can be reduced without lowering the dynamic torque.

Figure 11:
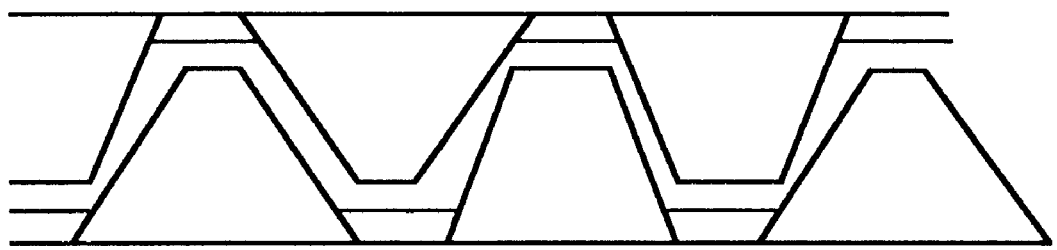
FIG. 11 is a front view showing another embodiment of the pole tooth having different amounts of skew according to the invention.
Figure 12:
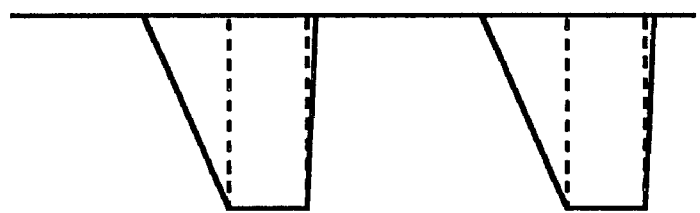
FIG. 12 is a front view showing an embodiment of the pole tooth having asymmetric amounts of skew according to the invention.

FIG. 11 shows another embodiment of the way of configuration (arrangement) of pole teeth having different amounts of skew and FIG. 12 shows an embodiment in which the amounts of skew are made asymmetric.

Figure 13:
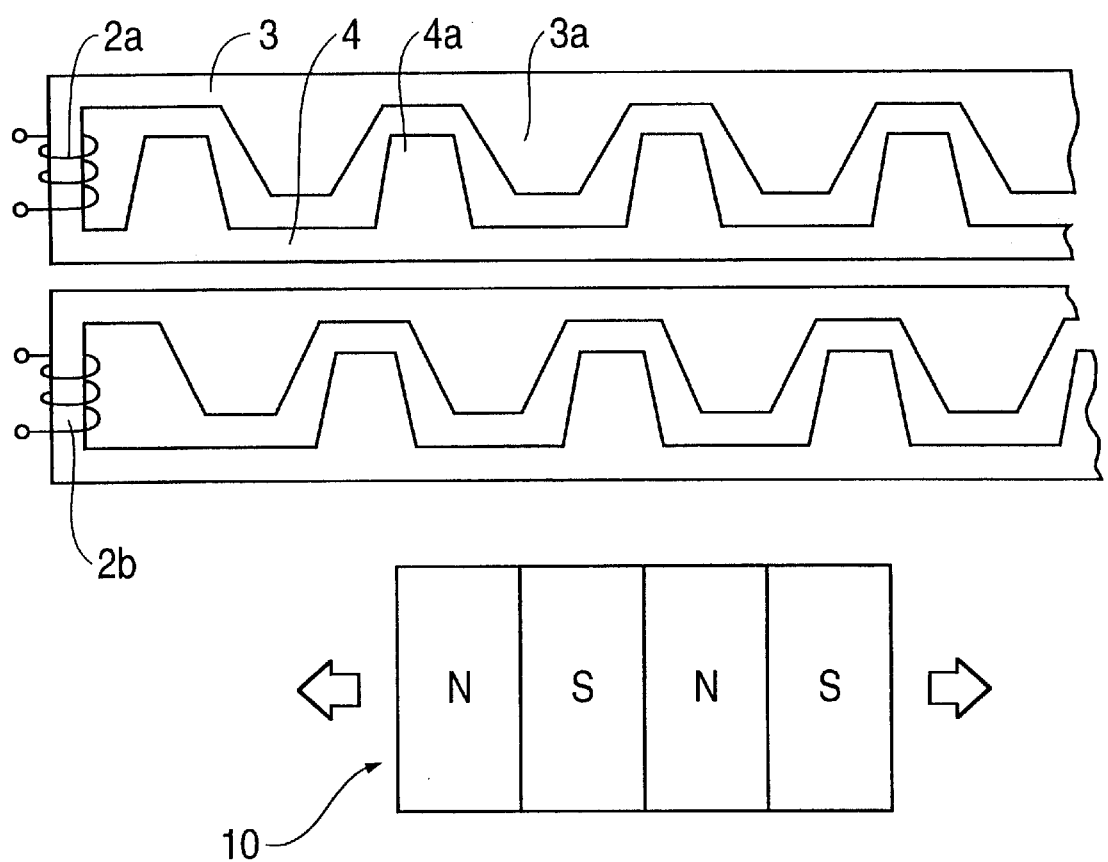
FIG. 13 is a development of the present invention applied to a linear motor.

While the invention has been described above as related to an embodiment carried out on a claw pole type stepping motor, the invention can also be applied to the pole teeth of such rotational electric machines as, for example, DC servomotors and brushless motors and, further, to a linear type stepping motor as shown in FIG. 13.

Since the present invention, as described above in detail, is, in a motor structure, arranged such that one pole tooth and the pole tooth corresponding thereto constituting one phase are made to have different shapes, i.e., to have different areas or different amounts of skew, so that the third harmonics generated by variations in the magnetic fluxes interlinking with these pole teeth may cancel each other, the rotational vibration which has hitherto been a problem can be reduced without lowering the dynamic torque characteristic of the motor and, besides, the accuracy in determining the movement of the rotor can be improved.

What is claimed is:

1. A motor structure having a first part with N and S magnetic poles disposed fixedly and alternately and a second part having pole teeth provided corresponding to the magnetic poles of the first part and spaced apart therefrom, each polarity of the pole teeth being changed so as to cause movement between said first part and said second part, the motor structure comprising:

an outer yoke including said second part;

an inner yoke including said second part;

first trapezoidal pole teeth, each having a first slant portion and being disposed in a periphery of said outer yoke at even intervals;

second trapezoidal pole teeth, each having a second slant portion which differs in size from said first slant portion, said second teeth being disposed at a center position between respective ones of said first pole teeth; and a coil exciting said first and second pole teeth;

whereby third harmonics generated by changes in magnetic fluxes interlinking with the first and second pole teeth are caused to cancel one another, and a slant S of the first and second pole teeth is defined by the equation S=2C/τP, where C is defined as one half of the slant portion of the lateral side of the pole teeth and τP is defined as the pole pitch.

2. A motor structure according to claim 1, wherein said motor structure is a rotating electric machine.

3. A motor structure according to claim 1, wherein said motor structure is a linear motor.

4. A motor structure according to claim 1, wherein said motor structure is a claw-pole type stepping motor having the pole teeth formed by bending a soft magnetic material, and wherein said claw-pole type stepping motor has a combination of two phases or more of a stator constituting one phase by having a coil with a polyurethane copper wire wound around the same wrapped in two stator yokes of which lateral sides of the pole teeth are given different slants.

5. A motor structure according to claim 4, wherein amounts of skew of the pole teeth of the two stator yokes constituting one phase are made different from each other so that phase differences of third harmonics of induced electromotive force waveforms are caused to amount to an electric angle of approximately 180°.

6. A motor structure according to claim 4, wherein a distance between the pole teeth of the two stator yokes constituting one phase is made greater than the distance between the pole tooth and a rotor magnet formed of a permanent magnet confronting the same.

7. A motor structure comprising:

a pair of stator yokes; and first and second trapezoidal pole teeth, the first and second pole teeth constituting a single phase and being different in size from one another;

each of said first and second pole teeth having a skew such that by adjusting the skew of the first and second pole teeth, a phase shift of 180° is set up between third harmonics in the pair of stator yokes, thereby causing the third harmonics to cancel one another and reduce vibration of said motor structure, and a slant S of the first and second pole teeth is defined by the equation S=2C/τP, where C is defined as one half of the slant portion of the lateral side of the pole teeth and τP is defined as the pole pitch.

* * * * *